United States Patent
Subramanian et al.

(10) Patent No.: US 11,748,145 B2
(45) Date of Patent: Sep. 5, 2023

(54) DATA PROCESSING SYSTEM USING SKELETON VIRTUAL VOLUMES FOR IMPROVED SYSTEM STARTUP

(71) Applicant: EMC IP Holding Company LLC, Hopkinton, MA (US)

(72) Inventors: Vasu Subramanian, Chapel Hill, NC (US); Yakov Stanislavovich Belikov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 17/150,041

(22) Filed: Jan. 15, 2021

(65) Prior Publication Data
US 2022/0229680 A1 Jul. 21, 2022

(51) Int. Cl.
*G06F 9/455* (2018.01)

(52) U.S. Cl.
CPC ...... *G06F 9/45558* (2013.01); *G06F 9/45541* (2013.01); *G06F 2009/45579* (2013.01); *G06F 2009/45583* (2013.01)

(58) Field of Classification Search
CPC ............. G06F 9/45558; G06F 9/45541; G06F 2009/45579; G06F 2009/45583
See application file for complete search history.

(56) References Cited

U.S. PATENT DOCUMENTS

| 9,052,823 B2 | 6/2015 | Yamamoto et al. |
| 2014/0223096 A1* | 8/2014 | Zhe Yang ............. G06F 3/0689 711/114 |
| 2015/0324139 A1* | 11/2015 | Inoue ..................... G06F 3/067 711/165 |

* cited by examiner

*Primary Examiner* — Dong U Kim
(74) *Attorney, Agent, or Firm* — BainwoodHuang

(57) ABSTRACT

A computer system includes a virtual machine (VM) host computer and a data storage system providing physical storage and mapping logic to store a virtual volume (vVol) for a VM. During a first operating session, first-session working data is stored on the vVol, the working data being session specific and not persisting across operating sessions. At the end of the first operating session, unmap operations are performed to deallocate underlying physical storage of the vVol, leaving the vVol as a skeleton vVol. At the beginning of a subsequent second operating session, and based on the existence of the vVol as the skeleton vVol, the VM host resumes use of the vVol for storing second-session working data of the VM during the second operating session. The retention of the vVol in skeleton form can improve system startup efficiency especially for a boot storm involving simultaneous startup of many VMs.

23 Claims, 3 Drawing Sheets

DATA PROCESSING SYSTEM USING SKELETON VIRTUAL VOLUMES FOR IMPROVED SYSTEM STARTUP

BACKGROUND

The present invention is related to the field of data storage, and in particular to data storage in connection with virtual volumes used by virtual machines (VMs) of a VM host computer.

SUMMARY

A computer system includes a virtual machine (VM) host computer and a data storage system which provides physical storage resources and related mapping logic to store a virtual volume (vVol) on behalf of a VM of the VM host. The VM host computer and data storage system are co-operative to (1) during a first operating session of a virtual machine (VM), store first-session working data of the VM on a VM-owned virtual volume (vVol), the working data being session specific and not persisting across operating sessions; (2) at the end of the first operating session, perform unmap operations to deallocate underlying physical storage of the vVol, and leaving the vVol existing as a skeleton vVol; and (3) at the beginning of a subsequent second operating session of the VM, and based on the existence of the vVol as the skeleton vVol, resume use of the vVol for storing second-session working data of the VM during the second operating session. The retention of the vVol in skeleton form can improve system startup efficiency especially in the case of a so-called "boot storm" involving simultaneous startup of hundreds or thousands of VMs.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
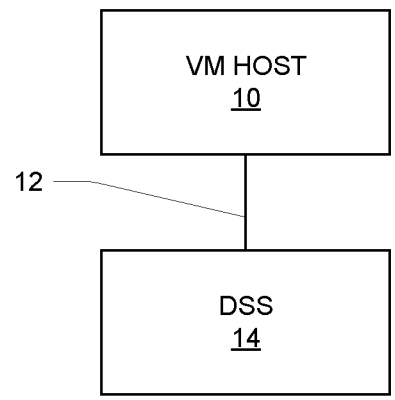
FIG. 1 is a simplified block diagram of a data processing system.

This detailed description is divided into two major sections, namely (1) an Overview providing background information as well as an example operating environment, and (2) a description of embodiments, providing somewhat more specific description in relation to the drawings.

Overview

The disclosed technique may find use in the particular example of Virtual Desktop Infrastructure (VDI), which is a known use-case for deploying a large number of user desktop sessions from a centralized infrastructure. Additionally, the disclosure focuses on a particular example environment, namely VMware® and its various components and tools. Those skilled in the art will appreciate that the technique is usable in other specific environments.

In operation, a VDI hosts desktop environments and deploys them to end-users on request. One method of deploying virtual user desktops is by using vVols to provide the storage infrastructure. In the VMware® environment, a vVol is defined as an integration and management framework that virtualizes SAN/NAS arrays, enabling a more efficient operational model that is optimized for virtualized environments and centered on the application, instead of the infrastructure.

In VDI environment it is common practice to start 100s and 1000s of the virtual desktops concurrently as users come to work in the morning and to shut down the desktops as the users leave work in the evening. The startup and shutdown of 1000s of these virtual desktops puts a lot of stress on the storage sub-system supporting the VDI environment. When a Virtual Machine is created from vVols, there are vVols for configuration (Config), multiple vVols for Data, and a vVol for swap. During the startup process the storage system can get many requests per user desktop to get these vVols ready for I/O operations. In a VMware environment, these requests employ the VASA® (vSphere API for Storage Awareness) protocol, and include binding for existing vVols to get them ready for I/O, and creation of swap vVols. When these operations are done concurrently for 1000s of Virtual Machines, each of these operations adds up and consumes a lot of CPU cycles and disk bandwidth on the storage subsystem. For instance, for a boot storm of 1000 vVol based virtual machine storage system could receive more than 30,000 VASA requests. And requests to create vVols have the longest processing time comparing to other requests participating in virtual machine creation. Also, each request to create a vVol is asynchronous, so it leads to subsequent VASA requests which track operation status. Such requests additionally consume bandwidth between the hosts and the storage system since each host has a limit on several parallel VASA requests.

The goal of VDI deployment is to provide increase in end user satisfaction by improving the speed of deployment of 1000s of these Virtual Machines. Users need access to their user desktops quickly. This operations of spinning up 1000s of these Virtual Machines on demand is called boot storm. Similar surge in operational request to storage system happens when these Virtual Machines are shutdown. During the analysis of startup of 1000s of VMs, the creation of swap vVol was seen to take a long time. Creation of a new vVol involves many interactions with Control Path, Platform and Data Path to successfully create a vVol in the data storage system.

VMware's ESXi supports multiple modes for VDI environment support. ESXi supports deployment in a vVol datastore as described above or deploying Virtual Machines in a VMFS datastore. Traditionally, VMFS datastores have been used for many years and vVol datastores is a new mode of deployment. When Virtual Machine are created on a vVol Datastore, and the Virtual Machine is shutdown, the swap vVol is deleted. This deletion of the swap vVol is expensive because when the Virtual Machine is started later, the swap vVol has to be created.

In one example, the processing of createVirtualVolume commands for swap vVols takes 22% of available processing time when 1000 VMs are started concurrently. There is also high cumulative time for updateVirtualVolumeMetadata at 27% of the total time. That loading can be expected to drop if the createVirtualVolume calls are eliminated. Also, eliminating createVirtualVolume calls will drop all getTaskUpdate requests which is at 17% So, overall eliminating the createVitrualVolume operations can help reduce the overall time needed for VM boot storm by ~55-65%. This reduction in processing time during VM startup is offset to some degree by addition of UNMAP SCSI call, although these are done asynchronously to VM shutdown and hence will not impact the VM boot storm.

A key feature of the disclosed technique is that instead of deleting the swap vVol when a Virtual Machine is shutdown, the swap vVol is instead unbound and UNMAP requests are issued for all blocks in the swap vVol. The data storage system may have optimized UNMAP processing to be able to free all blocks associated with swap vVol very efficiently. At the end of Virtual Machine shutdown and after the blocks in the swap vVol have been deallocated because of UNMAP, only a skeleton vVol is left in the storage sub-system. This skeleton vVol is immediately available for use upon subsequent startup. Avoiding vVol creation for swap will avoid an expensive operation from Virtual Machine startup process and also the related operations of updateVirtualVolumeMetadata and getTaskUpdate. Additionally, it will significantly reduce an average number of VASA requests received by a storage system per Virtual Machine power-on operation. This change helps the startup of Virtual Machine when 1000s of Virtual Machines are started concurrently.

There is also a second impact of this change. The host interacts with the storage sub-system via a control path (i.e., VASA provider) and data path (i.e., Protocol End Point). Typically during a Virtual Machine startup, all interactions with storage sub-system are via the control path and data path is used for reads and writes of blocks. VMware has had a concept of in-band vVol bind operation using the data path, but one of the issues with its adoption has been that out-of-band operations are required anyway for vVol creation, blunting the advantage of using in-band vVol binding. By removing the creation of swap vVol in the Virtual Machine startup phase, in-band bind operations can be more easily facilitated and effective.

DESCRIPTION OF EMBODIMENTS

FIG. 1 is a simplified depiction of a data processing system in relevant part. It includes a virtual-machine (VM) host computer 10 functionally connected by interconnect 12 to a data storage system (DSS) 14. The VM host 10 is a computer typically having a relatively conventional hardware organization but with a specific software configuration providing virtual-machine based computing, as outlined further below. In one example a VM host 10 may be a server type of computer running a virtual machine monitor (VMM) or "hypervisor" such as ESX® and providing compute services in the form of virtual machines (VMs), as generally known and described in additional detail below. A typical computer includes one or more processors, memory (volatile and non-volatile), and I/O interface circuitry, connected together by one or more data buses. The data storage system 14 is typically a purpose-built hardware device providing a variety of services related to secondary storage, as generally known in the art and as also outlined below. The interconnect 12 is typically provided by one or more networks, including any of a wide-area network (WAN), local-area network (LAN) and storage-area network (SAN).

Although the simplified depiction of FIG. 1 shows only a single VM host 10 and DSS 14 with interconnect 12, in general the disclosed techniques are applicable to more typical computer system installations having multiple VM hosts 10 and DSSs 14, with interconnects 12 being realized by a network infrastructure as noted. In one example the system is used to realize a virtual desktop infrastructure (VDI) as outlined in the Overview above. In this case the VM hosts 10 have connections to client-type computing devices, via the network infrastructure, which are consumers of the "desktops" (e.g., virtual PCs or workstations) provided by respective VMs of the VM host(s) 10. That is, each VM is a hosted desktop. These details are omitted from FIG. 1 for ease of depiction.

Figure 2:
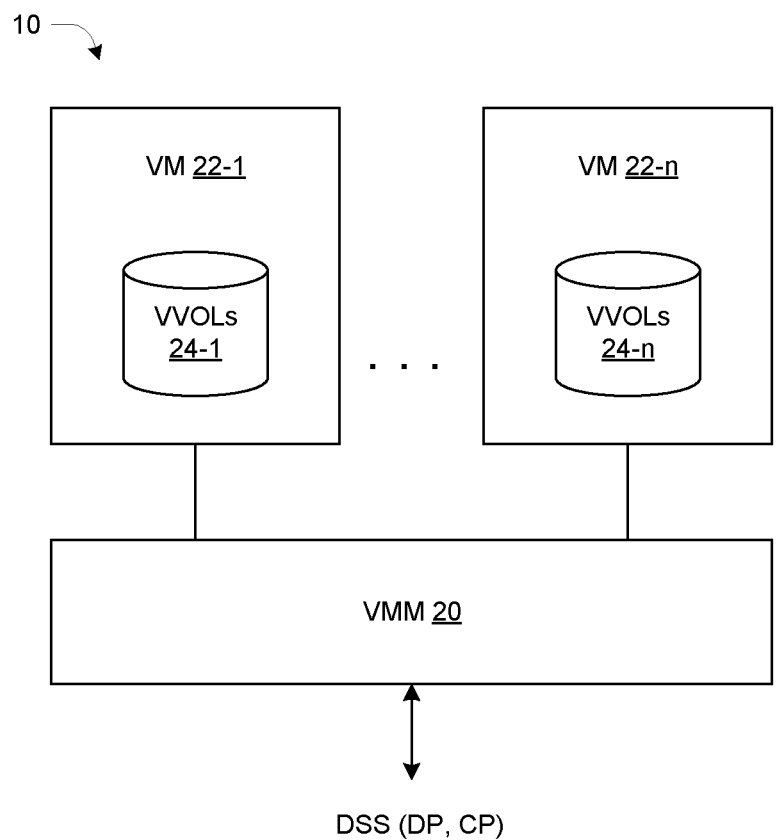
FIG. 2 is a functional block diagram of a virtual machine (VM) host computer.

FIG. 2 illustrates a VM host 10 from a software/function perspective. It includes a virtual machine monitor (VMM) 20 and a plurality of VMs 22 (shown as 22-1 through 22-$n$), each including a respective set of VM-specific vVols 24 (24-1 through 24-$n$). In one embodiment the VMM 20 can be realized as an ESX® hypervisor provided by VMware, Inc. Each VM 22 is a virtualized client-type computer, such as a PC or workstation, and as such it employs its vVols 24 in a generally known manner in operation, i.e., to store user applications and data, operating system (OS), configuration data, and working data for example. Of particular interest in the present description is a vVol 24 of the type that stores non-persistent working data, i.e., data that is present during operation but does not survive across operating sessions (e.g., across reboots or other restarts). A good example of such a device is a "swap" vVol, used by the guest OS of the VM 22 in connection with memory management. Generally, a swap vVol is created at the time a VM 22 initiates execution, and when its execution terminates the swap vVol is no longer needed and is thus deleted as part of the shutdown process. The disclosed techniques may be used in connection with swap vVols as well as analogous logical/virtual devices that store non-persistent data.

As indicated at the bottom of FIG. 2, the VMM 20 has two pertinent types of connections to the DSS 14, namely a datapath (DP) connection and a control path (CP) connection. In a typical case, the DP connection employs the SCSI protocol, augmented as necessary for vVol-based access to data stored by the DSS 14. The DP connection may also be referred to as "in-band" herein. The CP connection is typically a more generic network connection using a higher-level control protocol such as VASA® (vSphere API for Storage Awareness), and may be referred to using the term "out of band" herein.

Figures 3, 4:
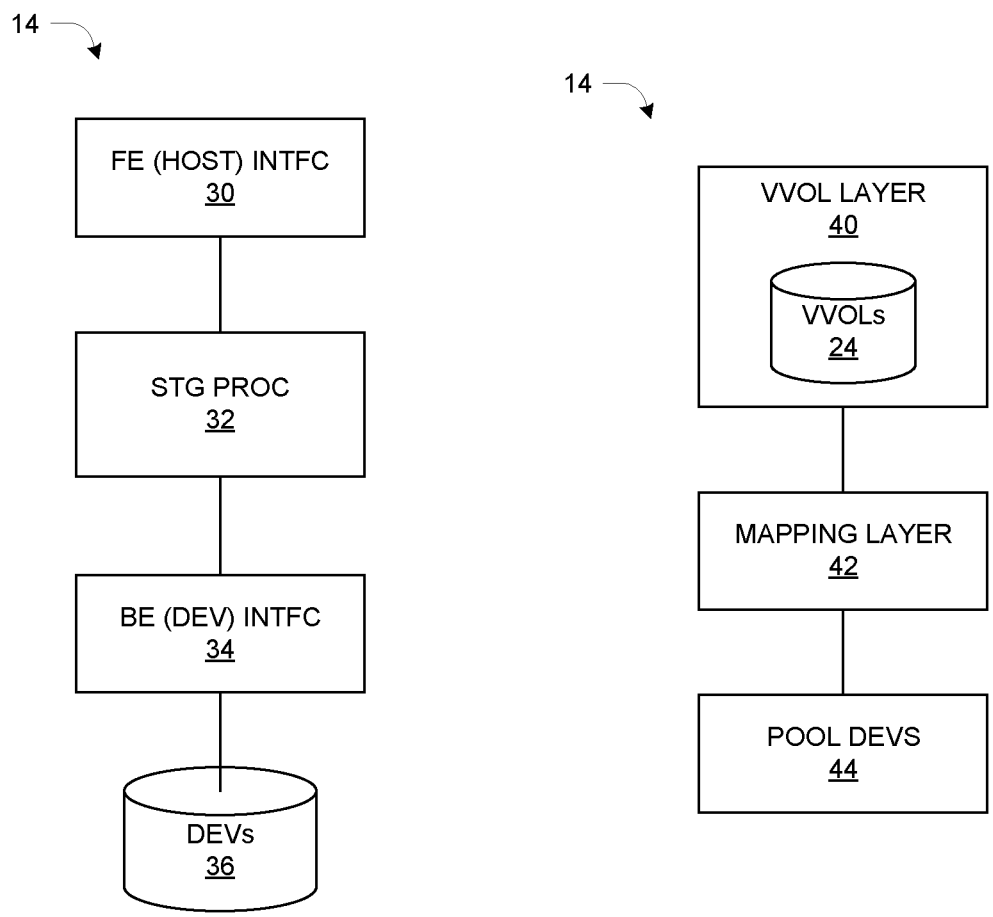
FIG. 3 is a block diagram of a data storage system from a hardware perspective.
FIG. 4 is a block diagram of a data storage system from a software/functional perspective.

FIGS. 3 and 4 illustrate the DSS 14 from a hardware and software perspective respectively. As shown in FIG. 3, at a hardware level the DSS 14 includes a front-end (FE) or host interface 30, storage processing (STG PROC) circuitry 32, a back-end (BE) or device interface 34, and physical storage devices (DEVs) 36 (which may be realized in any of a variety of forms including magnetic and sold-state, for example). The FE interface 30 provides an interface to the host-facing interconnect 12 (FIG. 1), while the BE interface 34 provides an interface to the physical devices 36, employing FibreChannel® or similar storage-oriented connection functionality. The storage processing circuitry 32 executes software that provides a variety of functions including the presentation of virtual or logical devices to the VM hosts 10 based on underlying physical storage resources of the devices 36, along with related services such as snapshots, replication and other resilience, deduplication, compression, etc.

FIG. 4 shows the software/functional organization in pertinent part, including a vVol layer 40, mapping layer 42, and pool devices (DEVs) layer 44. The vVol layer 40 is host-facing and includes all the functionality associated with vVols 24 as logical/virtual devices and their access by the VM host 10. The pool devices layer 44 is responsible for defining internal logical storage devices (not shown) constituted by extents carved from the physical storage devices 36. In one example, physical storage space is allocated from a pool of fixed-size extents called "slices" that may be 256 MB in size, for example. Slices are allocated to the internal volumes/devices as needed. The mapping layer 42 realizes the translation between the vVols of the vVol layer 40 and the pool-device representation of the pool devices layer 44. In one example the mapping layer 42 may employ an internal file system which consumes a pool device for underlying storage and presents the storage as a file of a file system to the vVol layer 40. Such a file system technique can be used to advantage to support the various ancillary services such as outlined above, i.e., snapshots, replication, etc.

Figure 5:
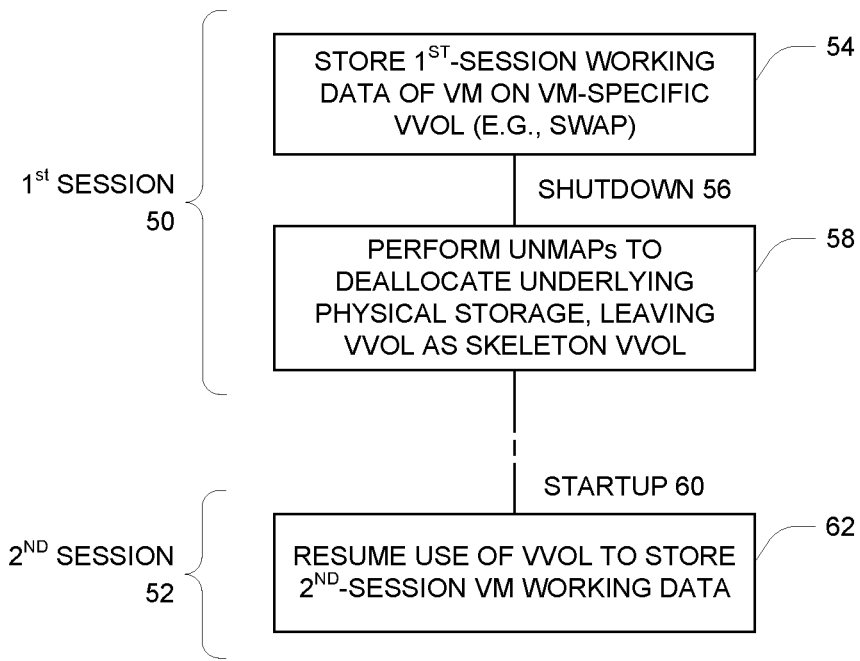
FIG. 5 is a flow diagram of operation related to use of skeleton vVols.

FIG. 5 illustrates pertinent operation as generally outlined in the Overview, namely, a particular technique of managing the shutdown and startup of VMs 22 that can avoid the need to delete and re-create their swap vVols across shutdown/startup cycles, and thus significantly improve performance of the DSS 14 during a boot storm or analogous event. It will be appreciated that the functionality is performed in part by the VM host 10 and in part by the DSS 14. Operation in two distinct phases is shown, namely, a first session 50 and a subsequent second session 52. These are separated by a shutdown/startup cycle as indicated and described more below.

At block 54 is regular operation during the first session 50. A VM 22 uses one of its VM-specific vVols 24 (e.g., its swap vVol) to storage working data. Because this working data is non-persistent and thus specific to the first session 50, it is referred to as "$1^{st}$-session working data". It will be appreciated that the VM's use of the vVol results in corresponding operations of the VMM 20 and the DSS 14. Within the DSS 14, the vVol 24 is the subject of data reads and writes and thus its contents vary dynamically accordingly. In one embodiment, within the DSS 14 a vVol 24 is realized as so-called "thin" volume, i.e., one whose actual allocated size varies as needed during operation. For example, the swap vVol 24 of a VM 22 may have a configured size of 2 GB, but at any given time it may store substantially less than 2 GB of actual swap data. Using thin-provisioning techniques, the DSS 14 uses only as much underlying physical storage (e.g., slices of devices 36) as needed to store the existing vVol data, generally much less than the 2 GB configured size.

Upon a shutdown 56 occurring during the first session 50, the VMM 20 of the VM host 10 operates (at 58) to release most of the underlying physical storage of the vVol 24, but without completely deleting it, in contrast to conventional techniques as mentioned in the Overview. In particular, the VMM issues SCSI Unmap commands which are acted upon by the mapping layer 42 to release corresponding physical extents back to the pool of the pool device layer 44, where they may be allocated to other vVols 24 or used for other purposes as needed. It should be noted that the Unmap commands are in-band (data path) commands, which are generally processed much more efficiently than control-path commands such as VASA commands. The result of the unmapping is to leave the vVol 24 in a state in which it is still in existence and associated with the corresponding VM 22 but substantially depopulated, i.e., it no longer stores working data and is correspondingly small in terms of physical storage it consumes. In this condition the vVol 24 is referred to as a "skeleton" vVol.

As further shown, upon a next subsequent startup 60 the $2^{nd}$ operating session 52 occurs, and as shown at 62, the VM 22 once again uses the vVol 24 to store its working data, which in this case is termed "$2^{nd}$-session" working data. More particularly, the VM 22 simply resumes such use of the vVol 24, because the vVol 24 is already existing (in skeleton form) when the VM starts up. Because the vVol 24 is already existing, there is no need to perform the various tasks needed to create a new vVol 24, which are outlined above in the Overview. This efficient resumption of use of an existing vVol 24 can greatly improve performance during a boot storm, avoiding the processing and communications required for creating a large number of vVols and preparing them for use.

In the processing of FIG. 5 it is necessary that there be a persistent record of the existence of the vVol that is available to the VM upon startup, so as to know whether the vVol needs to be created or not. This record may be kept in its Config vVol 24, which may contain not only an identification of the subject vVol 24 (e.g., the swap vVol), but also state information indicating whether it exists. Whenever the VM is started up, the Config vVol 24 is checked for this information. If the subject vVol exists, then the VM resumes using it, and otherwise it is first created and then made available for use by the VM.

Figure 6:
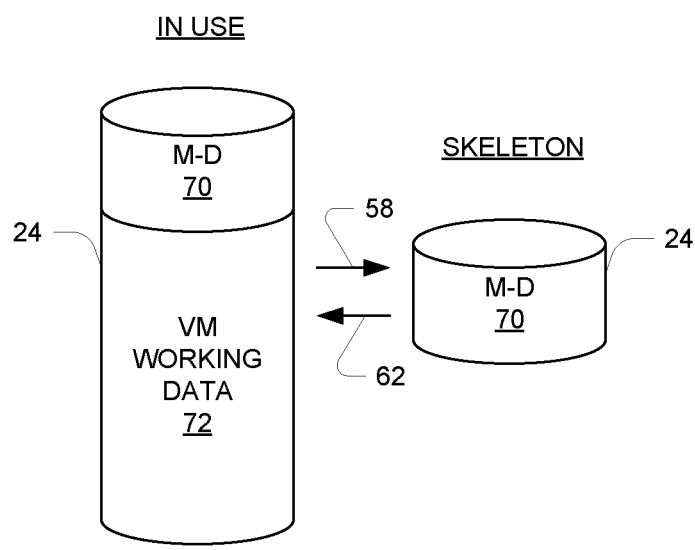
FIG. 6 is a schematic diagram of transitions of a vVol between normal in-use condition and skeleton condition.

FIG. 6 illustrates the effect of the above processing for a single vVol 24. In use during a session 50, 52 (at left in FIG. 6), it contains both metadata (M-D) 70 as well as a generally much larger amount of VM working data 72. The metadata 70 identifies various long-lived aspects of the vVol 24, such as its name and other access information, size (configured and actual allocated), backup/protection information, etc. As shown, as a result of the unmapping that occurs at 58 (FIG. 5), the vVol 24 transitions to the skeleton condition shown at right, where it is much smaller and stores only the metadata 70. The vVol 24 stays in this condition during the period of shutdown after the $1^{st}$ session 50, and in the subsequent operation 62 of $2^{nd}$ session 52 it again grows to accommodate the VM working data 72 of that session.

While various embodiments of the invention have been particularly shown and described, it will be understood by those skilled in the art that various changes in form and details may be made therein without departing from the scope of the invention as defined by the appended claims.

What is claimed is:

1. A method of operating a computer system having a VM host computer coupled to a separate data storage system, the VM host computer hosting a virtual machine (VM), the data storage system providing physical storage resources and related mapping logic to store a VM-owned virtual volume (vVol) on the data storage system on behalf of the VM, the method comprising:

during a first operating session of a virtual machine (VM), storing persistent metadata and first-session working data of the VM on a VM-owned virtual volume (vVol), the working data being session specific and not persisting across operating sessions, the persistent metadata describing aspects of the vVol and persisting across operating sessions, the persistent metadata identifying a variable allocated size of the vVol that varies during the first operating session according to a size of the first-session working data;

at the end of the first operating session, performing unmap operations to deallocate underlying physical storage for the working data of the vVol, and transitioning the vVol to a skeleton condition vVol storing only the persistent metadata identifying reduced allocated size accordingly; and at the beginning of a subsequent second operating session of the VM, and based on the existence of the vVol as the skeleton vVol, resuming use of the vVol for storing the persistent metadata and second-session working data of the VM during the second operating session, including using the persistent metadata to reflect growth of the vVol to accommodate the second-session working data.

2. The method of claim 1, wherein the vVol is a swap vVol used by the VM in connection with memory management.

3. The method of claim 2, wherein the existence of the swap vVol is indicated by information in a VM-specific configuration vVol persistently stored in connection with the VM, the configuration vVol being examined at the beginning of the second operation session to determine whether the swap vVol exists and is thus available for use in the second operating session without requiring creation.

4. The method of claim 1, wherein the unmap operations at the end of the first operating session are performed by a virtual machine manager (VMM) of the VM host computer issuing in-band unmap commands to the data storage system.

5. The method of claim 4, wherein the VMM is a bare-metal hypervisor performing the unmap operations for the first-session working data of the VM.

6. The method of claim 1, wherein the data storage system includes functional components at a vVol layer, mapping layer, and pool device layer, the vVol layer being host-facing and including all functionality associated with the vVol as a virtual device and its access by the VM host computer, the pool device layer being responsible for defining internal logical storage devices constituted by fixed-size extents carved from the physical storage resources of the data storage system, and the mapping layer providing for translation between the vVol of the vVol layer and a pool-device representation of the pool device layer.

7. A computer system comprising a VM host computer coupled to a separate data storage system, the VM host computer hosting a virtual machine (VM), the data storage system providing physical storage resources and related mapping logic to store a VM-owned virtual volume (vVol) on the data storage system on behalf of the VM, the VM host computer and data storage system being co-operative to:
   during a first operating session of the VM, store persistent metadata and first-session working data of the VM on the vVol, the working data being session specific and not persisting across operating sessions, the persistent metadata describing aspects of the vVol and persisting across operating sessions, the persistent metadata identifying a variable allocated size of the vVol that varies during the first operating session according to a size of the first-session working data;
   at the end of the first operating session, perform unmap operations to deallocate underlying physical storage for the working data of the vVol, and transitioning the vVol to a skeleton condition vVol storing only the persistent metadata identifying reduced allocated size accordingly; and
   at the beginning of a subsequent second operating session of the VM, and based on the existence of the vVol as the skeleton vVol, resume use of the vVol for storing the persistent metadata and second-session working data of the VM during the second operating session, including using the persistent metadata to reflect growth of the vVol to accommodate the second-session working data.

8. The computer system of claim 7, wherein the vVol is a swap vVol used by the VM in connection with memory management.

9. The computer system of claim 8, wherein the existence of the swap vVol is indicated by information in a VM-specific configuration vVol persistently stored in connection with the VM, the configuration vVol being examined at the beginning of the second operation session to determine whether the swap vVol exists and is thus available for use in the second operating session without requiring creation.

10. The computer system of claim 7, wherein the unmap operations at the end of the first operating session are performed by a virtual machine manager (VMM) of the VM host computer issuing in-band unmap commands to the data storage system.

11. The computer system of claim 10, wherein the VMM is a bare-metal hypervisor performing the unmap operations for the first-session working data of the VM.

12. The computer system of claim 7, wherein the data storage system includes functional components at a vVol layer, mapping layer, and pool device layer, the vVol layer being host-facing and including all functionality associated with the vVol as a virtual device and its access by the VM host computer, the pool device layer being responsible for defining internal logical storage devices constituted by fixed-size extents carved from the physical storage resources of the data storage system, and the mapping layer providing for translation between the vVol of the vVol layer and a pool-device representation of the pool device layer.

13. The computer system of claim 7, wherein the persistent metadata includes volume name, access information, and backup/protection information for the vVol.

14. The computer system of claim 7, wherein the data storage system comprises a front-end host interface, storage processing circuitry, a back-end device interface, and physical storage devices, the front-end host interface providing an interface to a host-facing interconnect by which the VM host computer accesses the data storage system, the back-end device interface providing an interface to the physical storage devices employing storage-oriented connection functionality, and the storage processing circuitry executing software that provides storage functionality including presentation of virtual devices to the VM host computer based on underlying physical storage resources of the physical storage devices, the storage functionality including the mapping logic to store the VM-owned vVol on behalf of the VM.

15. The computer system of claim 14, wherein the storage functionality includes functional components at a vVol layer, mapping layer, and pool device layer, the vVol layer being host-facing and including all functionality associated with the vVol as a virtual device and its access by the VM host computer via the host-facing interconnect and front-end host interface, the pool device layer being responsible for defining internal logical storage devices constituted by fixed-size extents carved from the physical storage devices, and the mapping layer providing for translation between the vVol of the vVol layer and a pool-device representation of the pool device layer.

16. A data storage system for use with a separate VM host computer hosting a virtual machine (VM), the data storage system providing physical storage resources and related mapping logic to store a VM-owned virtual volume (vVol) on the data storage system on behalf of the VM, the data storage system being configured to co-operate with the VM host computer to:
   during a first operating session of the VM, store persistent metadata and first-session working data of the VM on vVol, the working data being session specific and not persisting across operating sessions, the persistent metadata describing aspects of the vVol and persisting across operating sessions, the persistent metadata identifying a variable allocated size of the vVol that varies during the first operating session according to a size of the first-session working data;

at the end of the first operating session, perform unmap operations to deallocate underlying physical storage for the working data of the vVol, and transitioning the vVol to a skeleton condition vVol storing only the persistent metadata identifying reduced allocated size accordingly; and at the beginning of a subsequent second operating session of the VM, and based on the existence of the vVol as the skeleton vVol, resume use of the vVol for storing the persistent metadata and second-session working data of the VM during the second operating session, including using the persistent metadata to reflect growth of the vVol to accommodate the second-session working data.

17. The data storage system of claim 16, wherein the vVol is a swap vVol used by the VM in connection with memory management.

18. The data storage system of claim 17, wherein the existence of the swap vVol is indicated by information in a VM-specific configuration vVol persistently stored in connection with the VM, the configuration vVol being examined at the beginning of the second operation session to determine whether the swap vVol exists and is thus available for use in the second operating session without requiring creation.

19. The data storage system of claim 16, wherein the unmap operations at the end of the first operating session are performed by a virtual machine manager (VMM) of the VM host computer issuing in-band unmap commands to the data storage system.

20. The data storage system of claim 19, wherein the VMM is a bare-metal hypervisor performing the unmap operations for the first-session working data of the VM.

21. The data storage system of claim 16, including functional components at a vVol layer, mapping layer, and pool device layer, the vVol layer being host-facing and including all functionality associated with the vVol as a virtual device and its access by the VM host computer, the pool device layer being responsible for defining internal logical storage devices constituted by fixed-size extents carved from the physical storage resources of the data storage system, and the mapping layer providing for translation between the vVol of the vVol layer and a pool-device representation of the pool device layer.

22. The data storage system of claim 21, wherein the mapping layer employs an internal file system which consumes a pool device for underlying storage and presents the storage as a file of a file system to the vVol layer.

23. The data storage system of claim 16, wherein the persistent metadata includes volume name, access information, and backup/protection information for the vVol.

* * * * *